United States Patent Office 3,732,205
Patented May 8, 1973

3,732,205
PROCESS OF MAKING POWDERED
CELLULOSE LAURATE
James Teng, St. Louis County, Chokyun Rha, St. Louis, Barry L. Scallet, Clayton, and Marcella C. Stubits, St. Louis, Mo., assignors to Anheuser-Busch, Inc., St. Louis, Mo.
No Drawing. Original application July 25, 1969, Ser. No. 845,067, now abandoned. Divided and this application Jan. 15, 1971, Ser. No. 106,882
Int. Cl. C08b 3/10
U.S. Cl. 260—224                4 Claims

ABSTRACT OF THE DISCLOSURE

Powdered cellulose laurate is prepared by reacting cellulose with a reagent containing the lauroyl grouping to produce cellulose laurate, dissolving the cellulose laurate in chloroform, adding methanol slowly until the solution becomes cloudy, then adding a substantially greater amount of methanol rapidly, and recovering a powdered cellulose laurate.

---

This application is a division of application Ser. No. 845,067, filed July 25, 1969, now abandoned.

BACKGROUND OF THE INVENTION

First and smoke inhalation cause many deaths in otherwise survivable aircraft accidents. Investigations indicate that the fires usually are caused when the highly volatile fuel spills from damaged tanks and splatters throughout the wreakage. Fuel vaporizes and is easily ignited by hot engine parts or sparks from metal impact. Preliminary studies have demonstrated that gelled fuels are less likely to explode or burst into flames under aircraft crash conditions, and thus gelled fuels are a safety factor in jet aircraft.

We have developed cellulose and starch derivatives and a set of processing conditions to produce gelled jet fuel. Gelation is achieved by us on the basis that polymeric carbohydrate derivatives can agglomerate to form a coherent structure and trap the fuel within the gel matrix. Polymeric carbohydrate, which is ordinarily highly incompatible with fuel, is chemically substituted at its hydroxyl functions so that it acquires an affinity for the fuel.

Thus, one of the principal objects of the present invention is to provide a hydrocarbon or non-polar solvent gelled with a lipophilic polymeric carbohydrate derivative. Another principal object of this invention is to provide a gelled jet fuel having incorporated therein a cellulose laurate or a starch laurate. Still another object is to provide a method of making a gelled jet fuel from cellulose laurate or starch laurate. Other objects and advantages will become apparent hereinafter.

SUMMARY OF THE INVENTION

This invention comprises a gelled hydrocarbon product comprising fluid hydrocarbon and particles of lipophilic polymeric carbohydrate derivative. This invention further comprises a process of making said product.

The invention is not limited to laurate derivatives although this is preferred at present. Other esters or derivatives of starch, cellulose and other polymeric carbohydrates also possess enough lipophilic property to perform similarly. The gelling is not confined to jet fuel, as other hydrocarbon and non-polar solvents can also be gelled.

DETAILED DESCRIPTION

In the present invention, a lipophilic polymeric carbohydrate derivative, preferably cellulose laurate, is used with a hydrocarbon, preferably jet fuel. The lipophilic polymeric carbohydrate derivative has a percentage of substitution of 40% to 98%, preferably 68% to 88%. That means, on the average, 40% to 97% of the theoretically available hydroxyl functions per monosaccharide unit are substituted with lipophilic groups. The substitution must be carried out to the extent that the polymeric carbohydrate derivative acquires sufficient affinity for the fuel to permit solvation and dispersion but not so far as to lose its ability to have intermolecular association via hydrogen bonding. Excessive substitution will result in only a viscous solution whereas insufficiently substituted carbohydrate precipitates and exerts no influence on the fuel.

Other starch, cellulose and other polymeric carbohydrate esters and derivatives which may be used satisfactorily in the invention include stearate, oleate, octanoate and carbanilate.

The liquids which are gelled include liquid hydrocarbons and non-polar solvents, specifically jet fuel and gasoline. Other suitable solvents and hydrocarbons are pentane, hexane, dodecane, cyclohexane, toluene, xylene and chloroform.

The amount of polymeric carbonhydrate derivative is at least about 1.5 grams per 100 ml. liquid hydrocarbon and may be as much as about 15 g./100 ml. Preferably about 2 to about 6 g./100 ml. is used.

The moisture content of the carbohydrate derivative is between about 0 and 0.5% and preferably is about 0.1% by weight, although this is not critical.

The carbohydrate derivative is mixed with the hydrocarbon and dispersed therein by mixing with a Waring Blendor or other dispersing means until a colloidal dispersion or solution of a carbohydrate derivative in a hydrocarbon is formed. The time of mixing is between about 2 to about 10 minutes or longer depending on the intensity of agitation and the size of the mixing vessel. The temperature of the hydrocarbon during mixing is between about 25 and about 85° C. The particle sizes of the polymeric carbohydrate derivative in dispersion may vary between about 0.001 to about 1μ after blending into the fluid. The particle size before being incorporated into the fluid generally is greater.

After mixing, the polymeric carbohydrate derivative-hydrocarbon mixture is allowed to stand for about 5 minutes to about 10 hours to complete gelation.

The final gel has a specific gravity of substantially that of the solvent being gelled and in the case of jet fuel the specific gravity of the gel is between about 0.7 to about 0.9, preferably about 0.78 and about 0.85, and a minimum viscosity of 10 poise.

An advantage of using cellulose laurate over starch laurate, particularly in gelling jet fuels, is the higher stability temperature and shorter gelling speeds of cellulose laurate. Cellulose laurates have a melting point range of about 70–110° C. as compared to starch laurates' 40–45° C.

Cellulose laurates gel within 20 minutes at concentrations of as little as 2 g./100 ml., whereas starch laurates require 5–6 g./100 ml. to gel jet fuel in 8–10 hours.

Following are specific examples of our invention.

Example No. 1

32 gms. of starch granules are suspended in 500 ml. of a mixture of hot pyridine and dioxane at a temperature of 90° C. The mixture contains 20% pyridine and 80% dioxane by weight. The suspension is achieved by continuous agitation. The uniform suspension is then allowed to react with 240 gms. of lauroyl chloride until a percentage of substitution of 80% is achieved. This percentage of substitution is equivalent to a degree of substitution (D.S.) of 2.4. D.S. is a term commonly used in starch and cellulose technology where the maximum theoretical value is 3. This takes 4 hours and is at a temperature of 85° C. Crude starch laurate is then precipitated with the addition of 1000 ml. of methanol at a temperature of 25° C., purified by washing its chloroformic solution with 1000 ml. of water, and is finally reprecipitated by the addition of 1000 ml. of methanol. After drying to a moisture content of 0.2%, the purified starch derivative product, 110 gms., appears as a brittle resinous substance. 6 grams of this starch laurate is finely dispersed in 100 ml. of JP–7 fuel (a mixture of kerosene and gasoline), at a temperature range of 45–65° C. with the aid of a Waring Blendor operated at a speed of 16,000 r.p.m. for 5 minutes to obtain colloidal dispersion. The particle sizes of the starch product in dispersion are tentatively estimated to be ranging from 0.01 to $1\mu$. A minimum solid concentration of 4 gms. per 100 ml. fuel is necessary for gelling. The mix is allowed to stand for 15 minutes at a temperature of 25° C. to gel the suspension to a specific gravity of 0.80 and a minimum viscosity of 100 poise as measured by a Brookfield Viscometer.

Example No. 2

32 grams granular starch in 75 grams of 10% aqueous sodium hydroxide is reacted with 40 grams lauroyl chloride at a temperature of 60° C. for 2 hours to produce a starch laurate having a percentage of substitution, 50%–68%. This is washed with hot water and purified and dried as in Example No. 1 and mixed with kerosene at a rate of 6 grams starch derivative/100 ml. kerosene. The mixing is in a Waring Blendor for 10 minutes at a speed of 16,000 r.p.m. A colloidal suspension is formed and upon standing for two hours the suspension gels to a minimum viscosity of 200 poise.

Example No. 3

48 grams granular starch is mixed with 197 grams of methyl laurate in 200 ml. of dimethyl formamide which contains 4 grams of sodium methoxide as catalyst. The mixture is placed under a reduced pressure of 85 mm. Hg to remove methanol generated. After 6 hours at 90° C., the entire content is discharged into 2 liters of methanol, and the precipitate washed with hot water and then dried. The starch derivative has a percentage of substitution of 32%–60% and is capable of gelling hydrocarbon under the same conditions as Example No. 2.

Example No. 4 (gels containing non-polar solvents)

By using the same technique as in Example Nos. 1–3 using jet fuels, we have prepared gels with a number of other non-polar solvents. Examples of these solvents are listed as the following:

Hexane—a straight aliphatic hydrocarbon
Cyclohexane—an alicyclic hydrocarbon
Toluene—an aromatic hydrocarbon
Chloroform—a chlorinated hydrocarbon

Example No. 5

Starch, 16 gms., is dispersed in dioxane, 100 ml., containing 50 ml. of pyridine as a basic catalyst. The suspension is maintained at 90° C. for 1 hour. At the end of this time, oleoyl chloride, 150 gms., is introduced gradually. The reaction mixture remains in vigorous agitation for 6 hours at 95° C. The mixture is then poured into 2 l. of methanol and the starch oleate settles down as a highly viscous material. The crude oleate is then dissolved in chloroform, the solution washed with water and reprecipitated by 2 l. of methanol. After drying at 85° C. for 8 hours, the starch oleate is obtained as a dark resinous substance having a percentage of substitution of 68%.

Example No. 6

Starch stearate is prepared in a manner similar to starch oleate or laurate (Example Nos. 1–5). The acyl chloride is stearoyl chloride. Starch stearate is a dark brown solid at the percentage of substitution of 80%.

Example No. 7

Starch octanate is prepared in a manner similar to starch oleate (Example No. 1). Octanoyl chloride is used instead of oleoyl chloride. Starch octanoate has the appearance of a stiff gum at the percentage of substitution of 64%.

Example No. 8

A thoroughly dried starch, 10 gms., is dispersed in 100 ml. of pyridine and is allowed to react with phenyl isocyanate, 44 gms., after the suspension has reached 95° C. The reaction mixture is kept at this temperature for 12 hours. The reaction is interrupted by pouring the mixture into 1 l. of methanol. The precipitated starch carbanilate, a brownish mass, is resuspended in methanol, filtered and dried. It has a percentage of substitution of 84%.

Example No. 9

Trioxymethylene (33 gms.), calcium chloride (120 gms.) and dodecanol (235 ml.) are mixed together. Dry hydrogen chloride is then bubbled through the mixture at room temperature for 6 hours to form chloromethyl dodecanyl ether.

Chloromethyl dodecanyl ether (20 gms.) is added to react with 2 gms. of starch in 150 ml. of dimethyl formamide at 80° C. for 1 hour. The reaction mixture is poured into 1 l. of methanol, filtered and washed. The product has a percentage of substitution of 50%.

Examples Nos. 5–8 show the preparation of starch esters and Example No. 9 shows the preparation of a starch ether. These esters and ethers are mixed with jet fuel and other non-polar solvents following the processes of Example Nos. 1–4 to produce gelled products.

Example No. 10

Dissolving grade wood pulp (Buckeye Cellulose Corp., E–22), 11 gms., is dispersed in a mixture of dioxane, 600 ml., and pyridine, 32 ml. The mixture is warmed to 90° C. for 1 hour followed by the addition of lauroyl chloride, 170 gms. Reaction proceeds for 7 hours at 100° C. At the end of this period, the reaction mixture is stirred with 1 l. of methanol, whereupon the cellulose laurate precipitates. The cellulose laurate has a percentage of substitution of 90%–98% or a D.S. of 2.7 to 2.9.

The cellulose laurate is dissolved in chloroform, 600 ml., and washed with four 250 ml. portions of water. Mixing the chloroform solution with 1 l. of methanol after the water wash causes the precipitation of clean cellulose laurate. The resinous precipitate is dried at 85° C. for 6 hours.

Dispersion of this dry material at 85° C. in Jet A fuel yields viscous solutions which gel upon cooling to room temperature. A gel of 2 g./100 ml. has a melting point of 70° C. At 4 g./100 ml. the melting point rises to 110° C.

Example No. 11 (preparation of cellulose laurate powder)

Dissolving grade wood pulp (Buckeye Cellulose Corp., E–22), 11 gms., is dispersed in a mixture of dioxane, 600 ml., and pyridine, 32 ml. The mixture is warmed to 90° C. for 1 hour followed by the addition of lauroyl chloride, 170 gms. Reaction proceeds for 7 hours at 100° C. At the end of this period, the reaction mixture is stirred with 1 l. of methanol, whereupon the cellulose laurate precipitates.

The cellulose laurate precipitate is then dried over a vacuum filter and dissolved in 800 ml. of chloroform. The concentration of the cellulose laurate-chloroform solution should be about 5 g./100 ml.

Under vigorous agitation methanol is added slowly until the solution begins to become cloudy. It requires 600 ml. of methanol to reach this "cloud point." Quickly, 1000 ml. of methanol is well stirred into the solution to bring about a rapid precipitation of cellulose laurate as finely divided powder.

The powder is filtered and dried. The particle size ranges from 40 to 80 mesh (U.S. Standard Sieves) and weighs 40 gms.

This powder has the advantage over the cellulose laurate precipitate of Example No. 10 in that it can be dispersed in jet fuel at a lower temperature, i.e., on the order of 30° C. This is important in field operations where the laurate derivative may be mixed into the jet fuel at the place where the fuel is to be loaded into a plane.

Also, this powder can be mixed into jet fuel using a simple mixer rather than a Waring Blendor. This also facilitates field mixing.

Example No. 12

Cellulose laurate can also be prepared without the benefit of dispersion in a liquid solvent.

Shredded cellulose pulp (0.4 kg.) is placed in a heavy duty kneader, e.g. Sigma blade kneader. Pyridine (2.54 liters) is distributed evenly over the pulp. The pulp remains quite dry at this stage. It needs only a small amount of dioxane (about 2 liters) to render it pliable for kneading. Lauroyl chloride (4.52 kg.) is then incorporated and a reaction temperature of 100° C. is maintained for 4½ hours. The cellulose mixture becomes progressively more pasty and eventually to a doughy consistency at the end of the reaction time. Excess reagents are washed with methanol. The washed cellulose laurate can be purified further using chloroform as described in Example Nos. 10 and 11.

The much reduced fire hazard of the cellulose laurate gelled jet fuel has been demonstrated by F.A.A. tests. The F.A.A. "impact test" measured 93–100% reduction of heat released upon firing using cellulose laurate gelled jet fuel made in accordance with the procedures of this application.

Using starch laurate gelled jet fuel in the F.A.A. "impact test," the reduction in heat released on firing is 80–90%.

Thus, it is seen that the present invention provides a means whereby polymeric carbohydrate derivatives, when properly processed, will gel liquid hydrocarbons.

This invention is intended to cover all changes and modifications of the examples of the invention herein chosen for purposes of the disclosure, which do not constitute departures from the spirit and scope of the invention.

What we claim is:

1. A process of making powdered cellulose laurate consisting essentially of the steps of:
    reacting cellulose with a reagent containing the lauroyl grouping to produce cellulose laurate having a percentage of substitution of about 40% to about 98%,
    dissolving the cellulose laurate in chloroform,
    adding methanol slowly until the solution becomes cloudy,
    then adding a substantially greater amount of methanol rapidly, and
    recovering a powdered cellulose laurate of percentage of substitution of about 40% to about 98%.

2. The process of claim 1 whereby the reagent is lauroyl chloride.

3. The process of claim 1 wherein the concentration of cellulose laurate in chloroform is about 5 g./100 ml., and wherein the cellulose laurate-chloroform solution is vigorously agitated as the methanol is added.

4. The process of claim 1 wherein the particle size of the recovered cellulose laurate powder is between about 40 mesh and about 80 mesh (U.S. Standard Sieves).

References Cited

UNITED STATES PATENTS

| 3,432,252 | 3/1969 | McKelvey et al. | 260—224 |
| 2,802,819 | 8/1957 | Lederer et al. | 260—224 |
| 1,687,060 | 10/1928 | Clarke et al. | 260—224 |
| 3,329,664 | 7/1967 | Tsuda et al. | 260—224 |

OTHER REFERENCES

Weissberger, Technique of Organic Chemistry, vol. III, second edition, 1956, Interscience Publishers, Inc., New York, N.Y., pp. 474–479 and 512–514.

DONALD E. CZAJA, Primary Examiner

R. W. GRIFFIN, Assistant Examiner

U.S. Cl. X.R.

44—7 B